United States Patent [19]

Joseph et al.

[11] Patent Number: 6,136,994

[45] Date of Patent: Oct. 24, 2000

[54] METHOD FOR PREPARING HYDROPHOBIC CLAY

[75] Inventors: Julie Joseph, Neath; Bryan Thomas, Barry, both of United Kingdom

[73] Assignee: Dow Corning Limited, Wales, United Kingdom

[21] Appl. No.: 09/216,405

[22] Filed: Dec. 18, 1998

[30] Foreign Application Priority Data

Dec. 18, 1997 [GB] United Kingdom .................. 9726636

[51] Int. Cl.$^7$ ........................................ C07B 7/08
[52] U.S. Cl. ................ 556/400; 556/413; 556/419; 556/427; 556/438; 556/439; 556/440; 556/442
[58] Field of Search ..................... 556/400, 413, 556/419, 427, 438, 439, 440, 442

[56] References Cited

U.S. PATENT DOCUMENTS

| | | | |
|---|---|---|---|
| 2,531,427 | 11/1950 | Hauser | 556/400 |
| 3,015,645 | 1/1962 | Tyler | 260/46.5 |
| 3,839,389 | 10/1974 | Neumann | 556/400 |
| 4,053,493 | 10/1977 | Oswald | 556/9 |
| 4,072,796 | 2/1978 | Reinhardt et al. | 428/405 |
| 4,302,594 | 11/1981 | Berenguer et al. | 556/425 |
| 5,009,874 | 4/1991 | Parmentier et al. | 423/335 |
| 5,116,886 | 5/1992 | Wolff et al. | 523/209 |

FOREIGN PATENT DOCUMENTS

| | | |
|---|---|---|
| 932753 | 7/1963 | United Kingdom . |
| 1 326 907 | 8/1973 | United Kingdom . |

*Primary Examiner*—Paul F. Shaver
*Attorney, Agent, or Firm*—William F. Boley; Melvin D. Fletcher

[57] ABSTRACT

A method for the preparation of a hydrophobic clay by contacting an aqueous suspension of the clay with an organosilane of formula $R^1_a SiX_{4-a}$ or an organosiloxane comprising units of formula $R^2_n SiO_{(4-n)/2}$ in the presence of an acid and a water-miscible solvent. The resulting clay suspension is then contacted with a water-immiscible solvent to effect separation of the hydrophobed clay from the suspension.

11 Claims, No Drawings

METHOD FOR PREPARING HYDROPHOBIC CLAY

The present invention relates to the preparation of a hydrophobic clay, in particular the preparation of a hydrophobic clay by treatment thereof with an organosilicon compound.

Hydrophobic precipitated clay is useful as a reinforcing and/or extending filler in natural or synthetic rubbers and plastics, especially for applications where moisture sensitivity is a problem, for example cable and wire coatings, and is particularly useful as a reinforcing filler in silicone rubber compositions. Silicone rubbers formed mainly from cured polydiorganosiloxane fluids or gums alone generally have low elongation and tensile strength values; however, these physical properties may be improved by incorporating a reinforcing filler into the fluid or gum prior to curing.

A problem with using untreated clay filler as an ingredient for silicone rubber compositions, as well as with other fillers commonly employed in silicone rubber compositions, for example fumed and precipitated silica, is a tendency to interact with the polydiorganosiloxane fluid or gum causing a phenomenon typically referred to as "crepe hardening". Much effort has been made to treat the surface of reinforcing fillers with organosilanes or organosiloxanes to render the surface hydrophobic, reduce or diminish the tendency of the compositions to crepe harden, and thus improve the physical properties of the cured silicone rubber.

For example, U.S. Pat. No. 3,015,645 teaches the preparation of hydrophobic silica powders by reacting an organosilicon compound such as dimethyldichlorosilane or trimethylmethoxysilane with a silica organogel in the presence of an acidic catalyst to form a hydrophobic silica hydrogel. The hydrophobic silica hydrogel is contacted with a water-immiscible organic solvent to convert the hydrophobic silica hydrogel to a hydrophobic silica organogel which segregates into the organic phase.

U.S. Pat. No. 4,072,796 describes a method in which finely divided hydrophobic silica and silicates are prepared by precipitating alkali silicate solutions with mineral acids or metal salt solutions and treated with organohalosilanes selected from prepolycondensed organohalosilane and a mixture of prepolycondensed organohalosilanes.

U.S. Pat. No. 5,009,874 describes a method for making a hydrophobic precipitated silica useful as a reinforcing filler in silicone elastomers. An organosilicon compound is added to a suspension of the precipitated silica to hydrophobe the silica, followed by addition of a water-immiscible organic solvent to separate the hydrophobic precipitated silica from the aqueous phase.

According to the present invention there is provided a method for preparing a hydrophobic clay, which method comprises:

(A) allowing a clay to be rendered hydrophobic by contacting an aqueous suspension of the clay with an organosilicon compound in the presence of an acid and a water-miscible solvent, wherein the organosilicon compound is selected from (i) organosilanes of formula $R^1_aSiX_{4-a}$ wherein each $R^1$ is independently selected from hydrogen and optionally substituted hydrocarbon radicals having 1 to 12 carbon atoms, each X is independently selected from halogen and alkoxy radicals having 1 to 12 carbon atoms, and a=1, 2, or 3, and (ii) organosiloxanes comprising units of formula $R^2_nSiO_{(4-n)/2}$ wherein each $R^2$ is independently selected from hydrogen, hydroxy, and hydrocarbon radicals having 1 to 12 carbon atoms, at least 50 mole percent of the $R^2$ substituents being hydrocarbon radicals, and n is 2 or 3, and (B) contacting the clay suspension formed in step (A) with a water-immiscible solvent to effect separation of the hydrophobed clay from the suspension.

In step (A) of the present invention an aqueous suspension of a clay is hydrophobed with an organosilicon compound. Herein "clay" is given its dictionary definition, i.e. it refers to various forms of hydrated alumino silicate, e.g. those hydrated alumino silicates of general formula $Al_2O_3SiO_2.xH_2O$, where x is the degree of hydration. Commonly known examples of clays include Fuller's Earth, bentonite, kaolin (China clay) and diatomite. A preferred clay for use in the present invention is kaolin, for example comprising approximately 50% by weight $Al_2O_3$ and approximately 40–45% by weight $SiO_2$.

Preferred clays for use in the present invention have an average particle size of 10 $\mu$m or less, more preferably less than 2 $\mu$m. If desired, the clay may be subjected to a shearing force to reduce aggregate particle size and to improve the uniformity of the particle size distribution, prior to conduct of the present method. The shearing force may be applied, for example, by a mechanical means such as a high-speed mixer or by ultrasound.

The BET surface area of the clay used in the present method is not critical and may typically be from, for example, 5 $m^2$/g to 20 $m^2$/g. Preferred kaolin clays for use in the present method have a BET surface area from 8 $m^2$/g to 16 $m^2$/g.

Both calcined and uncalcined clays may be used in the present invention, although the former are preferred; calcination removes hydroxyl groups as water from the surface of the clay reducing hydrogen-bonding on the surface between hydroxyl groups thus leaving isolated hydroxyl groups available for reaction with the organosilicon compound. Typical calcination temperatures for clays are 750° C. and above.

The clay is present in step (A) of the present method in aqueous suspension. The amount of clay in the aqueous suspension is not critical and may be in a range of from 5 to 90 weight percent, more preferably from 10 to 50 weight percent, even more preferably from 10 to 30 weight percent.

The aqueous suspension of the clay is contacted with the organosilicon compound in the presence of a water-miscible solvent to facilitate the reaction of the organosilicon compound with the precipitated silica. Suitable water-miscible solvents include tetrahydrofuran and alcohols such as ethanol and isopropanol, with isopropanol being preferred.

The clay is treated with one or more organosilicon compounds selected from (i) and (ii) described above. For the organosilanes (i) of formula $R^1_aSiX_{4-a}$, each $R^1$ is independently selected from hydrogen and optionally substituted hydrocarbon radicals having 1 to 12 carbon atoms. For example, $R^1$ may be a monovalent hydrocarbon radical which is saturated or unsaturated, and/or which is substituted or unsubstituted. Each $R^1$ may be, for example, an alkyl radical such as methyl, ethyl, propyl, t-butyl, hexyl, heptyl, octyl, decyl, and dodecyl; an alkenyl radical such as vinyl, allyl, and hexenyl; or an aryl radical such as phenyl, naphthyl, and tolyl. When the organosilane (i) contains X as either a halogen or an alkoxy group $R^1$ may be substituted by one or more halogen atoms, for example $R^1$ may be a halogen substituted alkyl radical such as chloromethyl, 3,3,3-trifluoropropyl, and 6-chlorohexyl, and $R^1$ may contain a heteroatom in the hydrocarbon chain, for example to form a disulphide or polysulphide group. When the organosilane (i) contains X only as an alkoxy group $R^1$ may also be organofunctional substituted, for example by mercapto, amino, carboxylic acid, ester or amido groups. Each $R^1$ is preferably an alkyl radical. Each X in the above formula is independently selected from halogen and alkoxy radicals having 1 to 12 carbon atoms. As a halogen X is preferably chlorine. As an alkoxy radical X may be, for example, methoxy, ethoxy, and propoxy, preferably methoxy or ethoxy.

For the organosiloxanes (ii) comprising units of formula $R^2_n SiO_{(4-n)/2}$, each $R^2$ is independently selected from hydrogen, hydroxy, and hydrocarbon radicals having 1 to 12 carbon atoms, at least 50 mole percent of the $R^2$ substituents being hydrocarbon radicals, preferably methyl groups. For example, $R^2$ may be an alkyl, alkenyl or aryl group as described above for $R^1$. The organosiloxanes (ii) can be linear or cyclic, and their viscosity can range from that of a fluid to a gum.

Suitable organosilicon compounds include diethyldichlorosilane, allylmethyldichlorosilane, methylphenyldichlorosilane, phenylethyldiethoxysilane, 3,3,3-trifluoropropylmethyldichlorosilane, trimethylbutoxysilane, n-octyltriethoxysilane, sym-diphenyltetramethyldisiloxane, trivinyltrimethylcyclotrisiloxane, octamethylcyclotetrasiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, hexamethyldisiloxane, hexenylmethyldichlorosilane, hexenyldimethylchlorosilane, dimethylchlorosilane, dimethyldichlorosilane, mercaptopropylmethyldimethoxysilane, bis{3-(triethoxysilyl)propyl}tetrasulfide, polydimethylcyclosiloxanes and polymethylhydrogencyclosiloxanes comprising 3 to about 20 dimethylsiloxy units and preferably 3 to about 7 dimethylsiloxy units, and trimethylsiloxy, hydroxydimethylsiloxy or chlorodimethyl endblocked polydimethylsiloxane or polymethylhydrogensiloxane polymers having a viscosity within a range of about 1 mPa.s to 1,000 mPa.s at 25° C. Preferred examples of organosilanes (i) for use in the present invention include dimethyldichlorosilane and n-octyltriethoxysilane, and preferred examples of organosiloxanes (ii) include $(Me_2SiO)_4$, $(MeHSiO)_4$, $Me_3SiO(MeHSiO)_zSiMe_3$ and $HO(Me_2SiO)_yH$, wherein Me is methyl, z has an average value from 20 to 50 and y has an average value of from 10 to 15.

The organosilicon compound is added to adequately hydrophobe the clay, and is typically added in an amount of from 25 to 75 weight percent of the clay. An upper limit for the amount of organosilicon compound added is not critical since any amount in excess of the amount required for saturation treatment of the clay may act as a solvent in the present method, although preferably the amount of organosilicon compound added will be sufficient to treat the clay but not cause flocculation.

In step (A) of the present invention the aqueous suspension of the clay is contacted with one or more of the organosilicon compounds selected from (i) and (ii) described above in the presence of an acid. The acid may be, for example, a mineral acid such as hydrochloric, hydroiodic, sulphuric, nitric and phosphoric acid. When the organosilicon compound is a chlorosilane the acid may be generated in situ by hydrolysis of the chlorosilane or the reaction of the chlorosilane directly with hydroxyl groups on the clay surface. In step (A) it is only necessary that the acid be present in an amount sufficient to effect reaction of the organosilicon compound with the clay. Preferably, the acid catalyst provides a pH less than 6, more preferably a pH less than 3.

The temperature at which step (A) is conducted is not critical. Mixing of components in step (A) may conveniently be performed at room temperature with subsequent heating to facilitate treatment of the clay with the organosilicon compound. Clay treatment may be conducted, for example, at a temperature from 20° C. up to the reflux temperature of the water-miscible solvent.

Step (A) may further include addition of a surfactant to facilitate treatment of the clay with the organosilicon compound. Suitable surfactants include, for example, anionic surfactants such as dodecylbenzene sulfonic acid, non-ionic surfactants such as polyoxyethylene(23)lauryl ether and $(Me_3SiO)_2MeSi(CH_2)_3(OCH_2CH_2)_7OMe$ wherein Me is methyl, and cationic surfactants such as N-alkyltrimethyl ammonium chloride.

In step (B) of the present method the aqueous suspension of the hydrophobic clay is contacted with a water-immiscible solvent to effect separation of the treated clay from the aqueous suspension. In a preferred method, steps (A) and (B) of the invention are sequentially conducted; however, the water-immiscible solvent may be added prior to, simultaneously with, or subsequently to the addition of the organosilicon compound of step (A). In the first two situations the treatment of the clay is accompanied by a phase separation in which the treated clay separates into the solvent phase.

For purpose of this invention any solvent immiscible with water can be employed. Suitable water-immiscible organic solvents include low molecular weight siloxanes such as hexamethyldisiloxane, octamethylcyclotetrasiloxane, diphenyltetramethyldisiloxane and trimethylsiloxy endblocked polydimethylsiloxane fluids. When a siloxane is employed as the treating agent, for example hexamethyldisiloxane or octamethylcyclotetrasiloxane, it may also act as the water-immiscible solvent if added in sufficient quantities, thus obviating the need for additional water-immiscible solvent. In addition, suitable water-immiscible organic solvents include aromatic hydrocarbons such as toluene and xylene; heptane, and other aliphatic hydrocarbon solvents; cycloalkanes such as cyclohexane; ethers such as diethylether and dibutylether; halohydrocarbon solvents such as methylene chloride, chloroform, ethylene chloride, and chlorobenzene; and ketones such as methylisobutylketone. A preferred water-immiscible solvent is hexamethyldisiloxane.

The amount of water-immiscible organic solvent added to the present method must be sufficient to effect separation of the treated clay from the aqueous suspension, and typically a solvent to clay weight ratio greater than 0.01:1 is employed. The upper limit for the amount of water-immiscible solvent added is limited only by economic considerations such as solvent cost, solvent recovery or disposal expense, and equipment capacity. A preferred weight ratio of solvent to clay is from 0.25:1 to 2:1.

The water-immiscible solvent preferably has a boiling point below about 250° C. to facilitate its removal from the treated clay. However, the boiling point of the water-immiscible organic solvent is not critical since the solvent may be removed from the treated clay by filtration, centrifuging, or other suitable means.

The hydrophobic treated clay recovered in the solvent phase may be used, if desired, without further treatment. Alternatively, the hydrophobic treated clay may be washed to reduce contaminates. The hydrophobic treated clay may be recovered from the solvent, dried, and further treated, for example by heating.

The present invention will now be illustrated by way of example.

EXAMPLES

For each of the present Examples the following method was employed for treating the clay. The method was performed a number of times, each time using different amounts of clay, water, treating agent, acid, water-miscible solvent and water-immiscible solvent, and also using different clays and treating agents. The identity and amounts of materials used are shown in Table 1 below. In each of the Examples below the method of the present invention resulted in treatment and flocculation of the clay.

Clay was weighed into a 1 litre 3-neck round bottomed flask equipped with a mechanical stirrer and water condenser, and stirred at 200 rpm whilst distilled water and isopropanol (IPA) were added. The mixture was then acidified with HCl before addition of the treating agent. After addition of the treating agent, the flask was heated to reflux for 40 minutes and allowed to cool before flocculation is attempted by addition of hexamethyldisiloxane. The flocculated clay is then washed using 1–3 g NaHCO$_3$ in 500 g water followed by two further washes with 300 g water. Herein:

Treating agent A=(Me$_2$SiO)$_4$

B=dimethyldichlorosilane

C=(MeHSiO)$_4$

D=50:50 mixture of low mw linear and cyclic dimethylsiloxanes, approx. 15 mm$^2$/s E=trimethyl terminated polymethyl-hydrogensiloxane, approx. 30 mm$^2$/s F=hydroxy terminated polydimethylsiloxane (approx. 40 mm$^2$/s)

G=n-octyltriethoxysilane

IPA=isopropyl alcohol

HMDS=hexamethyldisiloxane

Polestar 200R and Polestar 501 are highly refined kaolin clays calcined at 1100° C. and 750° C. respectively available from ECC International Limited.

Speswhite is a highly refined uncalcined kaolin clay available from ECC International Limited.

Polestar and Speswhite are trade marks of ECC International Limited.

TABLE 1

| Treating agent | Wt.(g) treating agent | Clay (g) | Water (g) | Conc. HCl (cm$^3$) | IPA (g) | HMDS |
|---|---|---|---|---|---|---|
| Polestar 200R clay | | | | | | |
| A | 25.1 | 90.4 | 508.6 | 93 | 169.0 | 33 |
| A | 13.1 | 45.4 | 252.1 | 12 | 83.2 | 24 |
| A | 13.1 | 45.4 | 250.2 | 5 | 83.1 | 22 |
| B | 48.0 | 89.9 | 504.6 | — | 164.6 | 8.9 |
| B | 31.0 | 89.7 | 500.3 | — | 165.5 | 21.3 |
| B | 15.0 | 91.3 | 507.7 | — | 165.4 | 44.5 |
| C | 30.0 | 90.4 | 502.6 | 95 | 169.3 | 27.9 |
| D | 13.5 | 47.0 | 255.0 | 48 | 82.3 | 13 |
| E | 49.4 | 90.1 | 503.2 | 89 | 165.4 | 158 |
| F | 46.0 | 90.2 | 512.0 | 90 | 165.5 | 2.0 |
| G | 45.1 | 92.4 | 506.1 | 92 | 165.9 | 128 |
| Speswhite clay | | | | | | |
| A | 13.0 | 46.0 | 250.0 | 47 | 84.0 | 20.0 |
| C | 12.8 | 45.5 | 257.0 | 46 | 83.0 | 70 |
| Polestar 501 clay | | | | | | |
| A | 12.9 | 45.5 | 252.7 | 47 | 83.2 | 28.2 |
| C | 13.0 | 45.4 | 250.2 | 45 | 82.9 | 50 |

The concept "comprising" where used herein is used in its widest sense to mean and to encompass the notions of "include", "comprehend" and "consist of".

That which is claimed is:

1. A method for preparing a hydrophobic clay comprising (A) contacting an aqueous suspension of a clay with an organosilicon compound in the presence of an acid and a water-miscible solvent, thereby rendering the clay hydrophobic, wherein the organosilicon compound is selected from (I) organosilanes of formula R$^1_a$SiX$_{4-a}$ where each R$^1$ is independently selected from the group consisting of hydrogen and substituted hydrocarbon radicals having 1 to 12 carbon atoms, each X is independently selected from a group consisting of halogen and alkoxy radical having 1 to 12 carbon atoms, and a=1, 2, or 3, and (ii) organosiloxanes comprising units of formula R$^2_n$SiO$_{(4-n)/2}$ wherein each R$^2$ is independently selected from the group consisting of hydrogen, hydroxy, and hydrocarbon radical, and n is 2 or 3, and (B) contacting the suspension of clay of step (A) with a water-immiscible solvent to effect separation of hydrophobic clay from the suspension.

2. A method according to claim 1 wherein the clay comprises calcined kaolin.

3. A method according to claim 1 wherein the organosilicon compound is selected from the group consisting of (Me$_2$SiO)$_4$, (MeHSiO)$_4$, dimethyldichlorosilane, n-octyltriethoxysilane, Me$_3$SiO(MeHSiO)$_z$SiMe$_3$, and HO(Me$_2$SiO)$_y$, H wherein Me is methyl, z has an average value from 20 to 50 and y has an average value of from 10 to 15.

4. A method according to claim 1 wherein the aqueous suspension formed in step (A) has a pH less than 3.

5. A method according to claim 1 wherein the water-miscible solvent is isopropanol.

6. A method according to claim 1 wherein the water-immiscible solvent is a low molecular weight siloxane.

7. A method according to claim 6 wherein the water-immiscible solvent is hexamethyldisiloxane.

8. A method according to claim 1 wherein the weight ratio of the water-immiscible organic solvent to the hydrophobic clay is from 0.25:1 to 2:1.

9. A method according to claim 1 wherein steps (A) and (B) are performed sequentially.

10. A method according to claim 1 wherein steps (A) and (B) are performed substantially simultaneously.

11. A hydrophobic clay obtainable from the method in accordance with claim 1.

\* \* \* \* \*